US010909365B2

United States Patent
Ono

(10) Patent No.: US 10,909,365 B2
(45) Date of Patent: Feb. 2, 2021

(54) IMAGE PROCESSING APPARATUS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Michihiko Ono, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 16/185,083

(22) Filed: Nov. 9, 2018

(65) Prior Publication Data

US 2019/0147243 A1 May 16, 2019

(30) Foreign Application Priority Data

Nov. 13, 2017 (JP) .................... 2017-218409

(51) Int. Cl.
*G06K 9/00* (2006.01)
*G06T 7/13* (2017.01)
*H04N 5/232* (2006.01)

(52) U.S. Cl.
CPC ..... *G06K 9/00624* (2013.01); *G06K 9/00771* (2013.01); *G06T 7/13* (2017.01); *G06K 2209/23* (2013.01); *G06T 2207/30264* (2013.01); *H04N 5/23206* (2013.01)

(58) Field of Classification Search
CPC ........... G06K 9/00624; G06K 9/00771; G06K 2209/23; G06T 7/13; G06T 2207/30264; H04N 5/23206
See application file for complete search history.

(56) References Cited

U.S. PATENT DOCUMENTS

| | | | | |
|---|---|---|---|---|
| 9,129,524 B2* | 9/2015 | Delibaltov | ......... | G06K 9/00785 |
| 9,736,374 B2* | 8/2017 | Wu | .................... | H04N 5/23267 |
| 10,163,016 B2* | 12/2018 | Hayakawa | ............ | G08G 1/143 |
| 10,720,058 B2* | 7/2020 | Ding | .................. | B62D 15/0275 |
| 2018/0068564 A1* | 3/2018 | Tanigawa | ................. | G06N 3/08 |
| 2019/0147243 A1* | 5/2019 | Ono | ................... | G06K 9/00624 |
| | | | | 382/103 |

FOREIGN PATENT DOCUMENTS

JP         05-324954       12/1993

* cited by examiner

*Primary Examiner* — Gregory M Desire
(74) *Attorney, Agent, or Firm* — Venable LLP

(57) ABSTRACT

An image processing apparatus includes a computer, a memory, and a program stored in the memory that, when executed by the computer, causes the computer to perform acquiring an image obtained by capturing a parking lot including a plurality of parking regions capable of parking a plurality of automobiles, deciding, for the image, a determination target region for each of the plurality of parking regions so as to exclude a shielded region that is shielded by an automobile in a case in which the automobile is parked in another parking region, and detecting, from the image, an automobile in each determination target region, and determining, based on a result of the detection, the presence/absence of parking of an automobile in each of the plurality of parking regions.

14 Claims, 15 Drawing Sheets

F I G. 10A
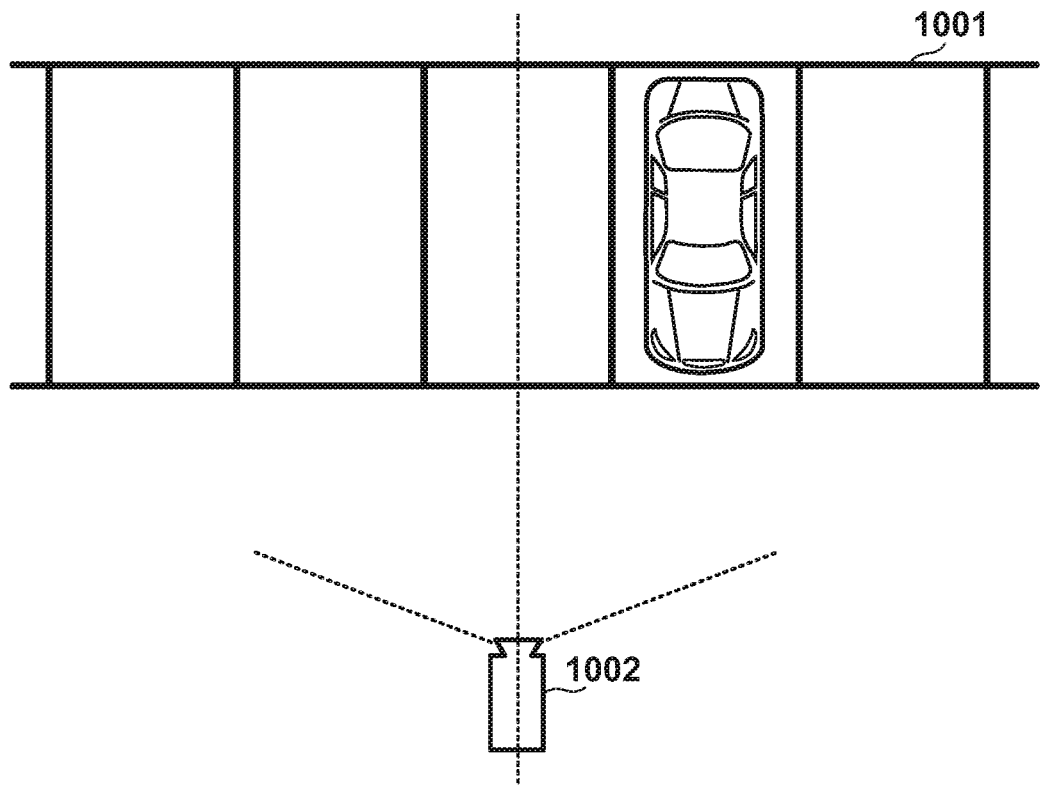
F I G. 10B
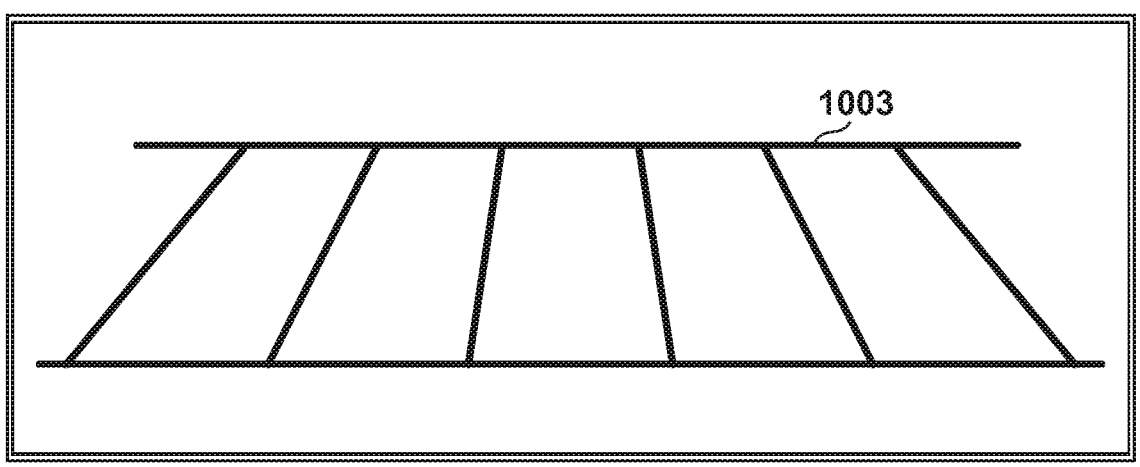

IMAGE PROCESSING APPARATUS, CONTROL METHOD THEREOF, AND NON-TRANSITORY COMPUTER-READABLE STORAGE MEDIUM

This application claims the benefit of Japanese Patent Application No. 2017-218409 filed Nov. 13, 2017 which is hereby incorporated by reference herein in its entirety.

BACKGROUND OF THE INVENTION

Field of the Invention

The invention relates to an image processing apparatus, a control method thereof, and a non-transitory computer-readable storage medium.

Description of the Related Art

Conventionally, there exists a need to detect whether a vehicle (for example, an automobile) is parked in each parking region of a parking lot in order to know the degree of congestion or a vacant state. As a method of detecting the presence/absence of a vehicle in each parking region, a method of detecting an object by installing a vehicle detection device, such as an infrared sensor, is used. However, the vehicle detection device generally has only a limited detection range, and the number of installed vehicle detection devices may be enormous in a large-scale parking lot. On the other hand, as another method of detecting the presence/absence of a vehicle in each parking region, a method of capturing parking regions by a camera, performing image processing for a captured image, and detecting whether a vehicle is parked is also used. In this method, when a plurality of parking regions are captured, the presence/absence of vehicles in the plurality of parking regions can be detected based on an image obtained by one camera.

Japanese Patent Laid-Open No. 5-324954 discloses a vehicle detection method using image processing. FIG. 9 is a view for explaining the detection method. Referring to FIG. 9, an image 900 is an image obtained by capturing a parking frame 901 in which four vehicles are parked. When detecting a vehicle by image processing, a processing target region is set. In the case of the parking frame 901, parking frames are set as target regions, like target regions 902 and 903, and image processing is performed for the set processing target regions, thereby detecting the presence/absence of a vehicle.

When the presence/absence of a vehicle is determined for the adjacent target regions 902 and 903, as shown in FIG. 9, by the conventional vehicle detection method, a determination error may occur, as will be described below.

First, if no vehicle is parked in the target region 903, as in an image 910, the target region 903 is determined to be "vacant". In addition, if a vehicle 904 is stopped in the target region 903, as in an image 920, the target region 903 is determined to be "occupied". On the other hand, as for the target region 902, if the target region 903 is vacant, as in the image 910, the target region 902 is also correctly determined to be "vacant". On the other hand, if the target region 903 is determined to be occupied, as in the image 920, the vehicle 904 stopped in the target region 903 is captured in a state in which the vehicle overlaps the target region 902. In this case, since the overlapping portion becomes noise, it may be impossible to correctly determine the parking state of the target region 902, and it may be erroneously determined to be "occupied".

SUMMARY OF THE INVENTION

As described above, in the conventional vehicle detection method, a determination error may occur due to the influence of presence/absence of a vehicle in an adjacent parking region. Hence, the invention provides a technique for enabling determination of a parking state without any influence of the parking state of an adjacent parking region.

One aspect of embodiments of the invention relates to an image processing apparatus comprising an acquisition unit configured to acquire an image obtained by capturing a parking lot including a plurality of parking regions capable of parking a plurality of automobiles, a decision unit configured to decide, for the image, a determination target region for each of the plurality of parking regions so as to exclude a shielded region that is shielded by an automobile in a case in which the automobile is parked in another parking region, and a determination unit configured to detect, from the image, an automobile in each determination target region and determine, based on a result of the detection, presence/absence of parking of an automobile in each of the plurality of parking regions.

Further features of the invention will become apparent from the following description of exemplary embodiments with reference to the attached drawings.

BRIEF DESCRIPTION OF THE DRAWINGS

FIG. 10A is a schematic view showing that a network camera is disposed in front of a parking region.

FIG. 10B is a view showing a captured image.

DESCRIPTION OF THE EMBODIMENTS

The embodiments of the invention will now be described in detail with reference to the accompanying drawings.

First Embodiment

Figure 1A:
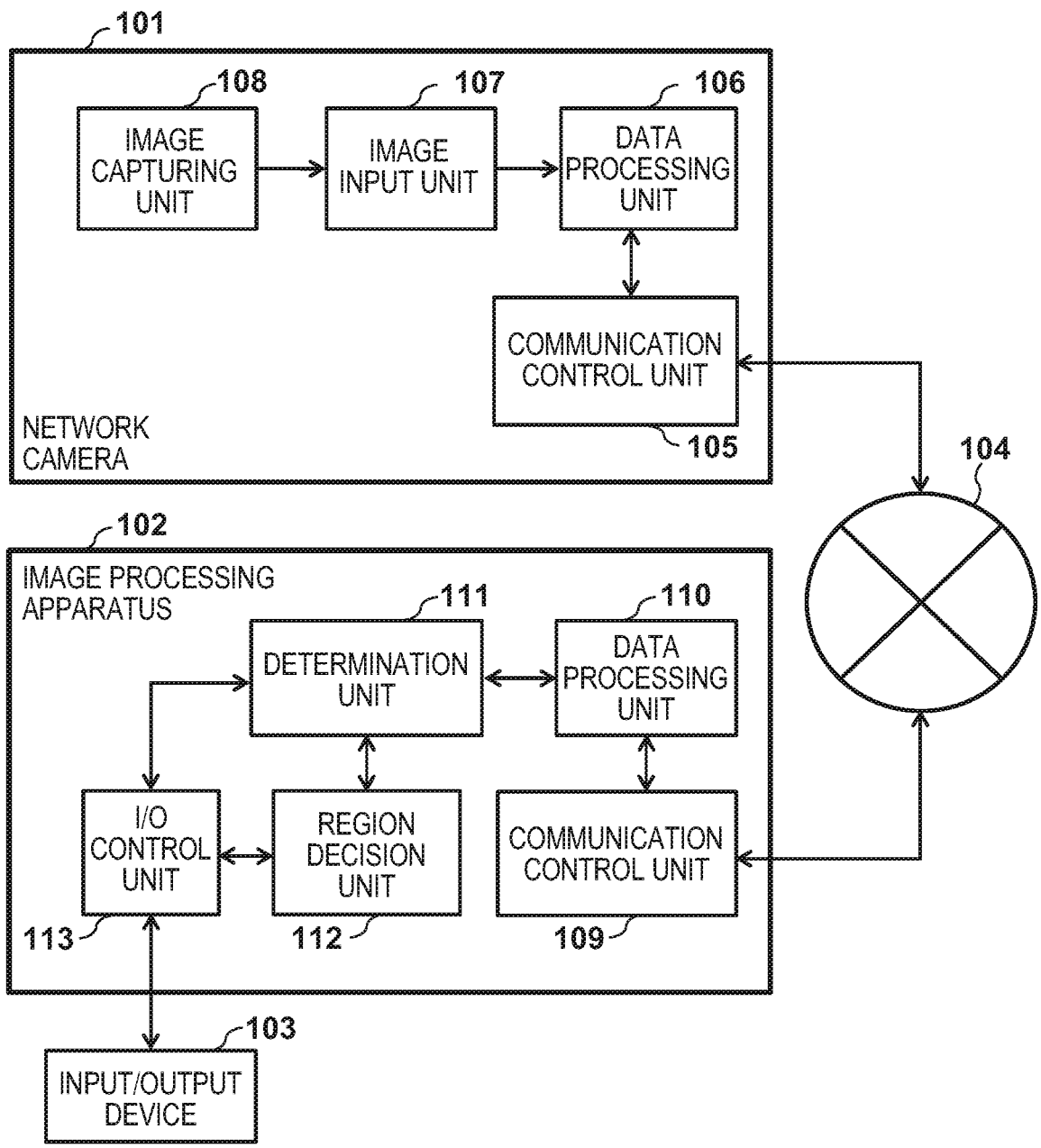
FIG. 1A is a block diagram showing an example of the arrangement of a parking state determination system corresponding to an embodiment of the invention.

FIG. 1A is a block diagram showing an example of the arrangement of a parking state determination system according to the first embodiment of the invention. A parking state determination system 100 shown in FIG. 1A is configured to include, for example, a network camera 101 that is an image capturing apparatus, an image processing apparatus 102 for determining a parking state by image processing, an input/output device 103, such as a display, and a keyboard, and a network 104 such as a local area network (LAN).

The network camera 101 distributes captured image data via the network 104. In addition, the image processing apparatus 102 receives, via the network 104, the image data distributed by the network camera 101. The image processing apparatus 102 also determines the parking state by analyzing the received image data and displays the determination result on a display, or the like, provided in the input/output device 103. In this embodiment, an arrangement that determines the parking state by analyzing image data distributed from the network camera 101 will be described. However, the method of acquiring image data of a determination target is not limited to this. For example, image data saved in a storage device in the network camera 101, a storage device connected to the image processing apparatus 102, or a storage device separately connected to the network 104 may be acquired by the image processing apparatus 102 and set to a determination target.

The input/output device 103 can include a keyboard, a mouse, a touch panel, a button, a switch, and the like, as input devices. The input/output device 103 can also include a display and a speaker as output devices. The input/output device 103 may be connected to the image processing apparatus 102 by a wired connection via a display information transfer cable (for example, a DVI cable or an HDMI® cable) or an input information transfer cable (for example, a USB connection cable), or may be connected wirelessly in accordance with a wireless communication protocol such as Bluetooth® or WLAN. Alternatively, a device for input/output may be separately prepared and connected via the network 104.

The network 104 connects the network camera 101 and the image processing apparatus 102 such that they can communicate with each other. In addition, the network 104 can be formed as, for example, a LAN. However, a wireless network or a network using a dedicated cable may be constructed.

Each of the network camera 101, the image processing apparatus 102, the input/output device 103, and the network 104 described above are illustrated as one block in FIG. 1A. However, each device may be formed by a plurality of pieces of hardware. Additionally, FIG. 1A shows the arrangement in which the network camera 101 and the image processing apparatus 102 are connected via the network 104. However, some functions of the image processing apparatus 102 may be imparted to the side of the network camera 101 such that parking state determination processing executed by the image processing apparatus 102 can be executed in the network camera 101. Furthermore, FIG. 1A shows the network camera 101, the image processing apparatus 102, and the input/output device 103 as independent components. However, they may be integrated to form a network camera having the functions of the components.

The arrangement and operation of each device shown in FIG. 1A will be described next. The network camera 101 can be configured to include a communication control unit 105, a data processing unit 106, an image input unit 107, and an image capturing unit 108. When the communication control unit 105 receives an image data request from the image processing apparatus 102, the image data generated by the network camera 101 is distributed via the network 104. At this time, the image capturing unit 108 captures a parking lot including a plurality of parking regions capable of parking a plurality of automobiles and outputs captured image data of a moving image or a still image to the image input unit 107. The image input unit 107 performs A/D conversion processing and predetermined development processing for the captured image data input from the image capturing unit 108 and outputs the image data to the data processing unit 106. The development processing can include, for example, processes such as De-Bayer processing, white balance processing, tone conversion processing, edge enhancement processing, flaw correction, noise removal, enlargement/reduction processing, and color conversion to the YCbCr format. The data processing unit 106 performs compression processing of the captured image data acquired from the image input unit 107 into a format such as Motion JPEG to generate image data and outputs the data to the communication control unit 105. The communication control unit 105 sends the image data to the network 104.

The image processing apparatus 102 can be configured to include a communication control unit 109, a data processing unit 110, a determination unit 111, a region decision unit 112, and an I/O control unit 113. When the image processing apparatus 102 is going to acquire image data from the network camera 101, the data processing unit 110 generates a request command for image data acquisition. The command generated by the data processing unit 110 is transmitted from the communication control unit 109 to the network camera 101 via the network 104. When the communication control unit 109 receives image data from the network camera 101 as a response to the request command, the image data is transferred to the data processing unit 110 and processed. The data processing unit 110 converts the image data into a format processable by the determination unit 111. In this embodiment, an image is converted into binary data based on edge detection processing, as will be described later with reference to FIG. 2. The determination unit 111 determines whether an automobile is stopped in a determination target region decided by the region decision unit 112. The determination result of the determination unit 111 is output to the input/output device 103 via the I/O control unit 113. For example, the input/output device 103 can display the received determination result on the display. In this embodiment, a case, in which the determination result is output to and displayed on the display of the input/output device 103, will be described. However, an arrangement for separately recording various file formats can be employed.

In the network camera 101, the image processing apparatus 102, and the input/output device 103 shown in FIG.

1A, the blocks except physical devices, such as an image capturing element, a display element, a keyboard, and a touch panel may be formed as hardware using dedicated logic circuits and memories. Alternatively, each block may be formed as software by causing a computer, such as a CPU, to execute a processing program stored in a memory.

Figure 1B:
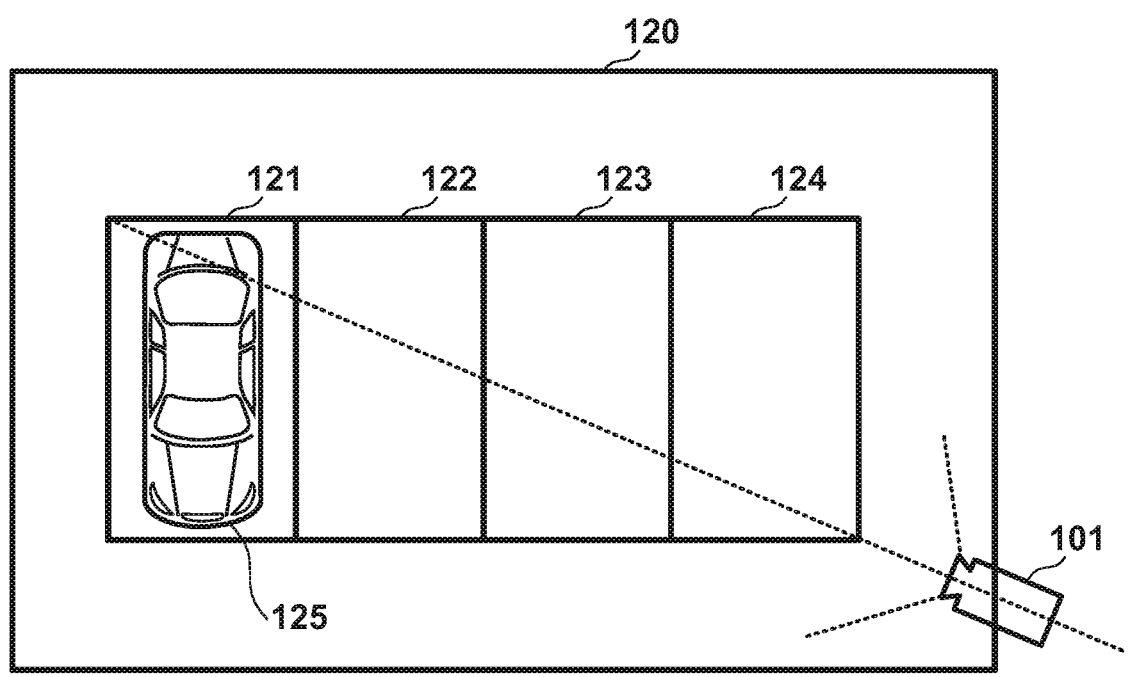
FIG. 1B is a view showing an example of the disposition of a network camera 101 in the parking state determination system corresponding to the embodiment of the invention.

The capturing state of a parking lot by the network camera 101 will be described next with reference to FIG. 1B. FIG. 1B is a view showing an example of the disposition of the network camera 101 in a parking lot according to this embodiment.

In FIG. 1B, the network camera 101 is installed at a position to capture a parking lot 120 of a monitoring target from an oblique direction. At this time, the parking lot 120 is partitioned into a plurality of parking regions 121 to 124 such that a plurality of automobiles can be parked. The network camera 101 can be disposed, for example, on or near the extended line of a diagonal line of a rectangle formed by the parking regions 121 to 124. In this embodiment, a term "parking region" will be explained as a term representing a region to park one automobile. In this embodiment, a parking lot formed by adjacent parking regions for four automobiles will be described as an example. However, the number of parking regions is set to four merely as an example, and the number of parking regions included in the parking lot to which the invention is applicable may be greater or lesser. FIG. 1B shows a case in which only one automobile 125 is parked as an example. In this embodiment, a case in which the parking regions are partitioned by lines and are directly adjacent to each other is shown. However, partition by lines need not always be done. Alternatively, the parking regions may be disposed at a predetermined interval.

In this embodiment, in the positional relationship of the network camera 101, the parking regions 121 to 124, and the automobile 125 as shown in FIG. 1B, an explanation will be made assuming that an object close to the side of the network camera 101 or close to the front side of the automobile 125 exists on the near side. For example, the parking region 124 is located closest to the network camera 101 in the four parking regions and, therefore, exists at the nearest position. Additionally, concerning the relationship of the parking regions 123 and 124, the parking region 124 is a parking region adjacent on the near side of the parking region 123. In addition, of the four sides or four apexes of a rectangular shape that defines each parking region, a side or apex located on the front side of the automobile 125 is located on the near side.

Figure 2:
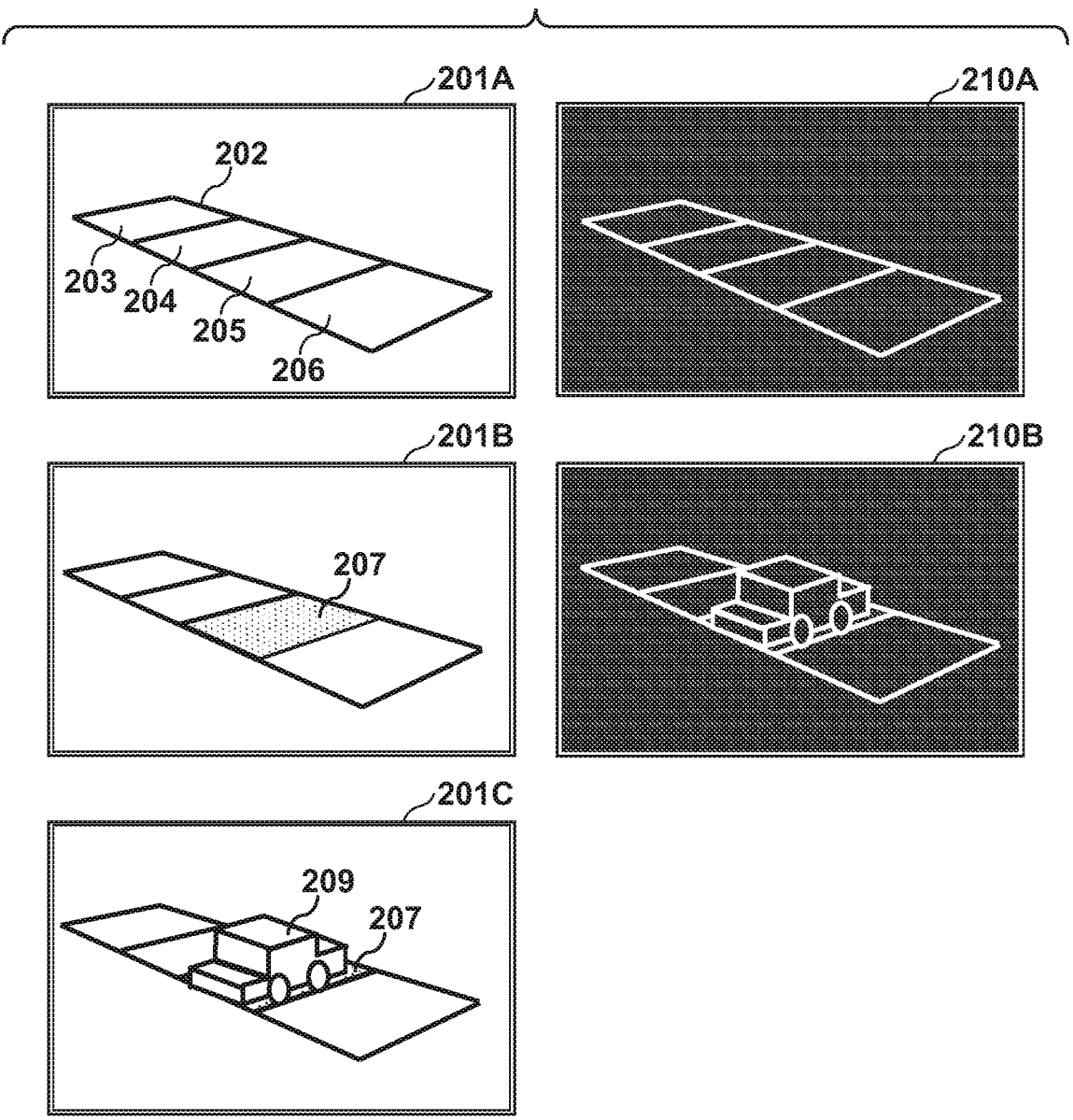
FIG. 2 is a view for explaining an example of a determination method.

Details of parking state determination processing in the image processing apparatus 102 will be described next. An image of a parking lot including a plurality of parking regions capable of parking a plurality of automobiles, which is a processing target in this embodiment, will be described first with reference to FIG. 2. An image 201A shown in FIG. 2 is an example of a captured image obtained when the parking lot 120 with a positional relationship as shown in FIG. 1B is captured by the network camera 101. In this embodiment, for the image, an X-axis is set in the horizontal direction, and a Y-axis is set in the vertical direction while setting the origin at the upper left corner of the image. Each pixel is given coordinate information (x, y) representing the position on the coordinate system.

In the example shown in FIG. 2, the image 201A includes four parking regions 203 to 206 partitioned by frame lines 202 as regions corresponding to the parking regions 121 to 124. Here, no automobile is parked yet. An image 201B shows a state in which a determination target region 207 is set inside the frame lines of the parking region 205 of the above-described parking regions 203 to 206 for the image 201A. In addition, an image 201C shows an example of a state in which an automobile 209 is stopped on the set determination target region 207.

Images 210A and 210B show examples of images of edge detection results obtained by performing edge detection processing of extracting edge information from the images 201B and 201C. Here, the edge detection results are shown as binary images. In the images 210A and 210B, white portions correspond to pixels determined to constitute edges in the images 201B and 201C, and grey portions correspond to pixels determined not to constitute edges. The image 210A shows an edge detection result obtained when no automobile is parked at all, as shown in the image 201B, and the image 210B shows an edge detection result obtained when the automobile 209 is parked in the determination target region 207, as shown in the image 201C.

In this embodiment, a case in which the presence/absence of a car is determined based on the amount of an edge component existing in the determination target region will be described. More specifically, a threshold concerning an edge component amount is determined in advance. If the edge component amount included in the determination target region is less than the threshold, the region is determined to be "vacant". If the edge component amount is equal to or greater than the threshold, the region is determined to be "parking". In the image 210A, since no edge component exists in a region corresponding to the determination target region 207 in the image 201B, the region is determined to be "vacant". On the other hand, in the image 210B, edges corresponding to the body, tires, and the like, of a car are included in a region corresponding to the determination target region 207. If the edge component amount exceeds the threshold, the region is determined to be "parking".

In this embodiment, an arrangement for determining the presence/absence of a parked automobile by the above-described method will be described. However, the method of determining the presence/absence of an automobile in a specific region is not limited to the above-described method, and various methods are usable.

Figure 3:
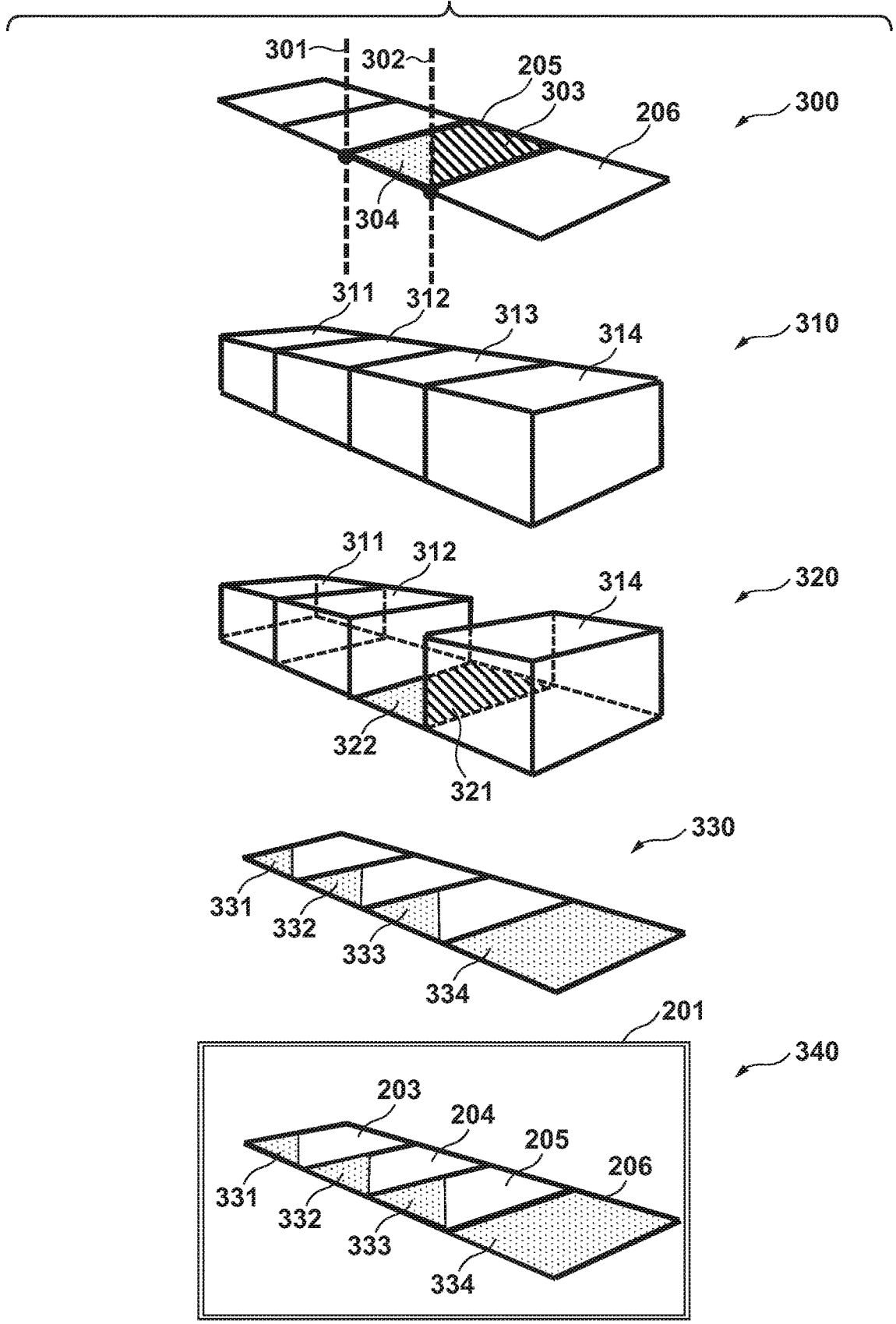
FIG. 3 is a view for explaining an example of a determination target region decision method.

A determination target region setting method corresponding to this embodiment will be described next. The determination target region according to this embodiment can be set so as to include a range without any influence of a parked automobile even in a case in which an automobile is stopped in a parking region adjacent to a parking region as a determination target. Details of the determination target region will be described below with reference to FIG. 3. FIG. 3 is a view for explaining the determination target region setting method corresponding to this embodiment.

A view denoted by reference numeral 300 in FIG. 3 shows an example of the determination target region setting method. A case in which the determination target region is set for the parking region 205 that is the second region from the near side and is indicated by bold lines in the four adjacent parking regions 203 to 206 will be described here. In the example denoted by reference numeral 300, broken lines 301 and 302 represent perpendiculars set on two apexes located on the front part in the four apexes of a rectangle that forms the parking region 205. Inside the parking region 205, when an automobile is stopped in the parking region 206 adjacent to the parking region 205, a region 303 on the right side of the perpendicular 302 is shielded by the automobile at a high possibility. On the other hand, even if an automobile is stopped in the parking region 206 adjacent to the parking region 205 as the determination target, a region 304 sandwiched between the perpendiculars 301 and 302 is not shielded by the automobile. In this embodiment, such a region is called a non-shielded region. On the other hand, a region shielded by an automobile or a region of a parking region other than a non-shielded region is called a shielded region. In this embodiment, the determination target region of the parking region 205 is set to the region 304 that is a non-shielded region except a shielded region, thereby properly determining the presence/absence of a stop of an automobile in the parking region 205 regardless of the presence/absence of an automobile in the other parking region 206 adjacent on the near side.

Next, views denoted by reference numerals 310 and 320 are views for explaining a method using rectangular parallelepiped models as another example of the determination target region setting method. In this example, a rectangular parallelepiped model is a model that schematically represents the shape of each automobile to be parked. The example denoted by reference numeral 310 shows a state in which automobiles are stopped in the four adjacent parking regions 203 to 206 by rectangular parallelepiped models 311 to 314. The height of each rectangular parallelepiped model can be decided in advance based on the general height of automobiles. Alternatively, the height may be decided based on the height of an automobile of maximum size capable of stopping.

The example denoted by reference numeral 320 shows a state in which, in the four adjacent parking regions 203 to 206, only the second parking region 205 from the near side does not have a stopped automobile. In this state, when determining the presence/absence of parking of an automobile in the parking region 205, a region 321 of a region inside the parking region 205 is shielded by an automobile (rectangular parallelepiped model 314) that is parked in the parking region 206 adjacent on the near side. The region 321 is a shielded region influenced by an automobile when an automobile is stopped in the parking region 206 adjacent on the near side. On the other hand, a region 322 inside the parking region 205 is a non-shielded region that is not shielded by an automobile even if an automobile is stopped in the parking region 206 on the near side. Hence, the region 322 that is a non-shielded region can be set to the determination target region of the parking region 205.

Note that the method indicated by reference numerals 310 and 320 uses a rectangular parallelepiped model having a predetermined height as a model of an automobile. However, a model designed after an actual automobile may be used, or a quadrangular prism having an infinite height may be used.

In this embodiment, a determination target region can be set for each of the plurality of parking regions 203 to 206 by the two methods described above. A view denoted by reference numeral 330 shows an example of determination target regions set for the parking regions 203 to 206, respectively. Regions 331 to 334 are the set determination target regions. Here, since the determination target region 334 on the nearest side has no parking region adjacent on the near side, the entire parking region 206 is a non-shielded region. In the example denoted by reference numeral 330, the entire parking region 206 is a determination target region. However, the determination target region may have the same shape as that set for the remaining regions. In this case, the calculation load can be reduced because the determination target region becomes narrow.

An image 340 is a view showing an example of display in a case in which the determination target regions set in the above-described way are identifiably displayed by superimposing them on an image captured by the network camera 101. This allows the user of the network camera 101 to visually recognize the position to perform detection in the parking lot. In addition, the size and shape of each determination target region can be adjusted based on the display.

Figure 4:
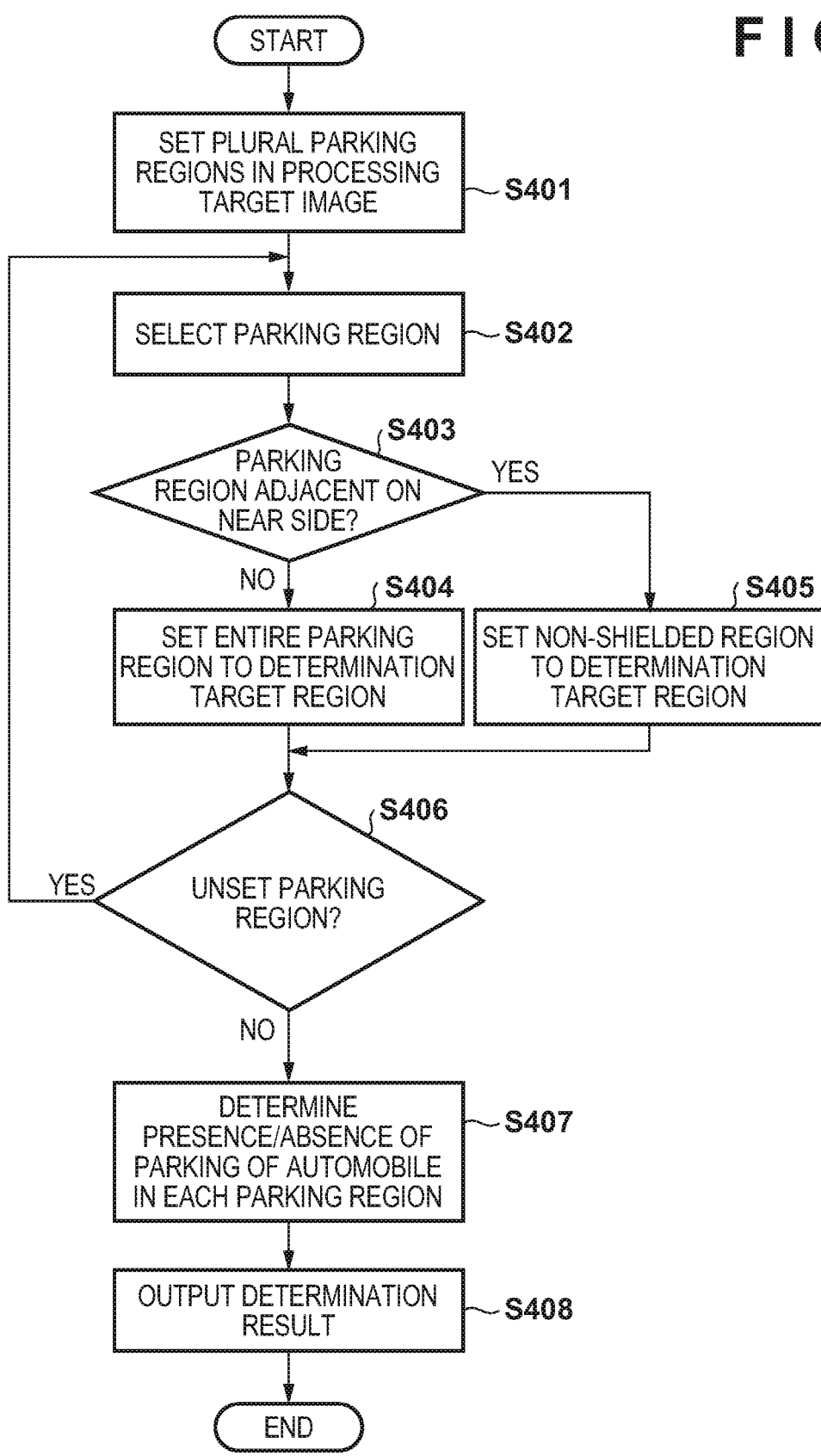
FIG. 4 is a flowchart showing an example of a determination target region setting method.

The procedure of processing according to this embodiment will be described next with reference to FIG. 4. In this embodiment, after the determination target regions are set, the parking state of an automobile is determined for an image received from the network camera 101. FIG. 4 is a flowchart showing an example of processing in the image processing apparatus 102. Processing corresponding to the flowchart can be implemented by, for example, executing a corresponding program (stored in a ROM, or the like) by one or more processors functioning as the data processing unit 110, the determination unit 111, and the region decision unit 112.

First, in step S401, the region decision unit 112 processes an image of a processing target received from the network camera 101 and sets a plurality of parking regions. In this embodiment, the parking regions 203 to 206 are set from the image 201A, as described with reference to FIG. 2. For example, in a parking lot as shown in the image 201A, the parking region can sequentially be selected from the parking region 203. Alternatively, the parking region may be selected in a reverse order from the parking region 206. Next, in step S402, the region decision unit 112 selects a parking region to set a determination target region from the plurality of parking regions. Next, in step S403, the region decision unit 112 determines, for the selected parking region, the presence/absence of a parking region adjacent on the near side. For example, in the image 201A shown in FIG. 2, for the parking regions 203 to 205, it is determined that a parking region adjacent on the near side exists. In this case, the process advances to step S405. On the other hand, for the parking region 206, it is determined that a parking region adjacent on the near side does not exist. In this case, the process advances to step S404.

Whether a parking region adjacent on the near side exits can be determined based on the coordinate information of pixels forming each parking region. For example, the parking regions basically have a rectangular shape each and are arranged in a predetermined direction. Hence, under an image capturing condition shown in FIG. 1B, the relative positional relationship of the parking regions can be specified by comparing the maximum coordinate values of pixels forming the parking regions. More specifically, in the regions 203 to 206 shown in the image 201A of FIG. 2, of the apexes that form each region, the apex having the maximum coordinate values is located on the nearest side. Hence, when the magnitudes of the coordinate values are compared, the relative positional relationship between the parking regions can be specified. At the same time, it is possible to decide which parking region is located on the near side with respect to a certain parking region and whether the parking region is adjacent on the near side.

Figure 5:
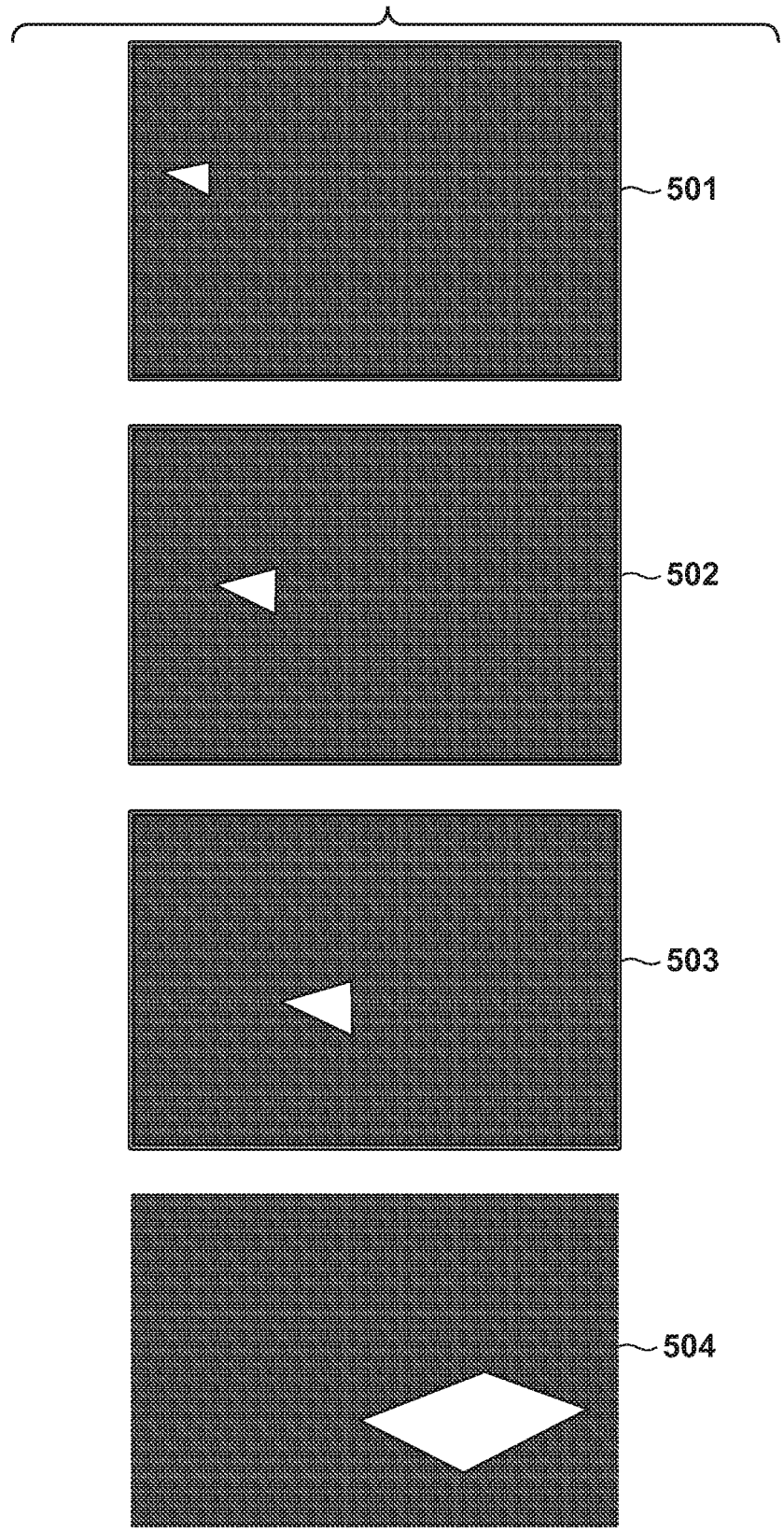
FIG. 5 is a view for explaining an example of information representing a determination target region.

Next, in step S404, for the selected parking region, the region decision unit 112 sets a determination target region on the entire parking region. At this time, for example, the region decision unit 112 can generate a mask in which the values of pixels corresponding to the entire parking region are set to one, and the pixel values of the remaining region are set to zero. Additionally, in step S405, the region decision unit 112 sets, for the selected parking region, the determination target region to the non-shielded region in the parking region. The method of deciding the non-shielded region is the same as described with reference to FIG. 2. At this time, for example, the region decision unit 112 can generate a mask in which the values of pixels corresponding to the non-shielded region are set to one, and the pixel values of the remaining region are set to zero. FIG. 5 shows examples of masks generated sequentially for the parking regions 203 to 206 and used to set determination target regions. The region decision unit 112 provides the mask information generated for each parking region to the determination unit 111 as information used to specify the determination target region.

In step S407, based on the mask information provided from the region decision unit 112 and the edge information provided from the data processing unit 110, the determination unit 111 determines the presence/absence of parking of an automobile for each of the plurality of parking regions. This determination can be done, for example, in the following way. First, concerning the pixel values that form the edge information and the mask information, the AND is calculated between the pixel values at corresponding positions. At this time, in the edge information, a pixel corresponding to an edge component has a pixel value of one. In the mask information, a pixel included in the determination target region has a pixel value of one. Hence, a value of one is obtained by the AND for the edge component in the determination target region. On the other hand, an edge component outside the determination target region has a value of zero because the pixel values of the mask information are zero. Accordingly, only the edge components in the determination target region can be extracted. The determination unit 111 then calculates the edge component amount (for example, the number of pixels forming the edges) for the edge components in the determination target region based on the logical operation result and compares the edge component amount with a threshold, thereby determining whether an automobile is parked in the corresponding parking region. When this determination is performed using pieces of mask information 501 to 504, as shown in FIG. 5, the determination unit 111 can determine the presence/absence of a parking region of an automobile for each of the parking regions 203 to 206.

The determination unit 111 can change the magnitude of the threshold in accordance with the size of the determination target region. The threshold may be set for each determination target region. For example, a value obtained by multiplying the number of pixels forming the determination target region by a predetermined coefficient may be used as the threshold. In addition, the sizes of determination target regions may be classified into several groups, and a threshold may be set for each group. In this case, a common threshold is used for determination target regions having sizes belonging to the same group. In addition, the edge component amount may be obtained as the ratio of edge components in the determination target region (the number of pixels forming the edge components/the number of pixels forming the determination target region). In this case, since a threshold corresponds to a ratio, a common threshold may be set for a plurality of determination target regions.

Figure 6:
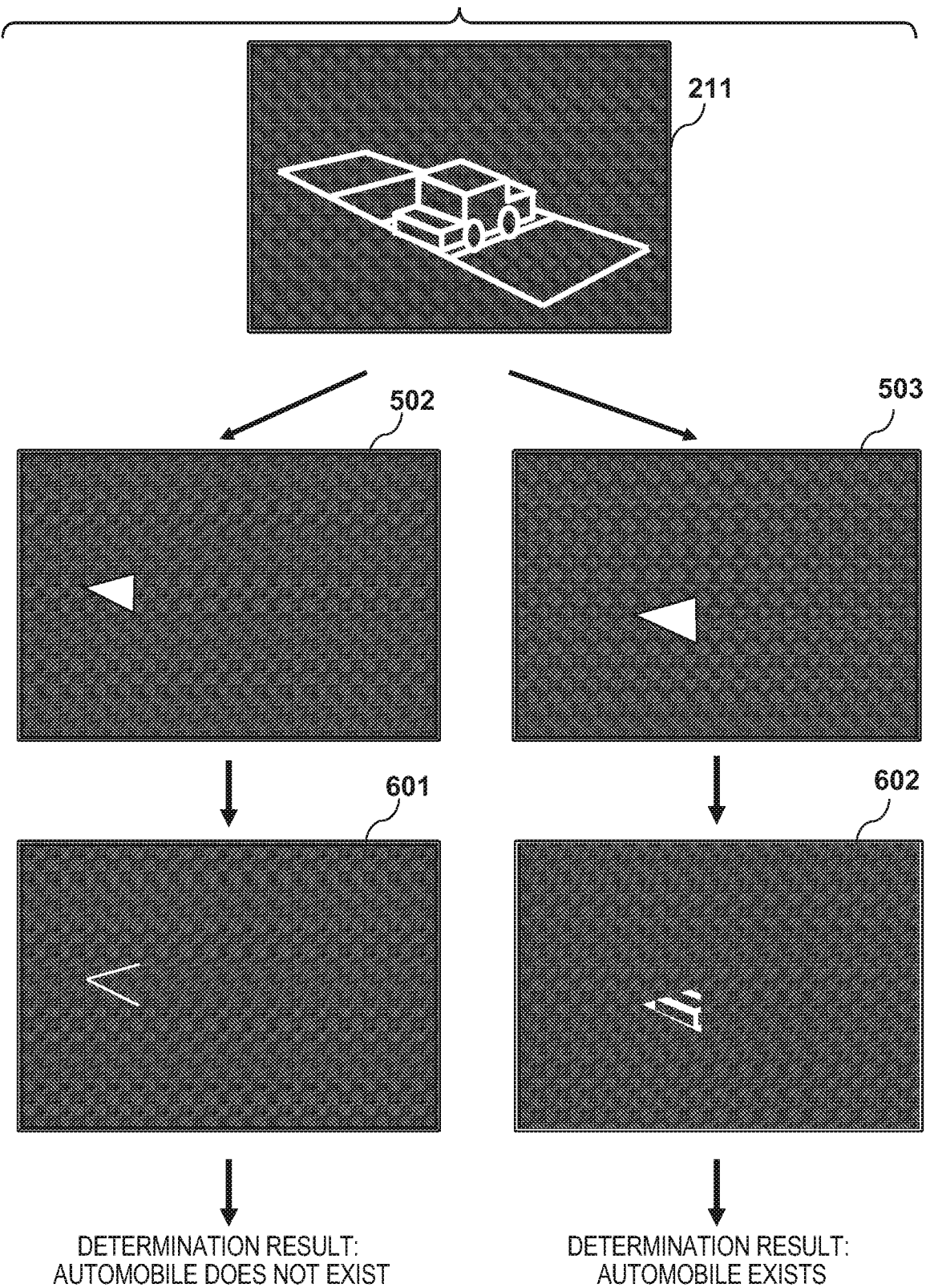
FIG. 6 is a view for explaining an example of determination processing using a determination target region.

FIG. 6 is a view showing an example of determination processing for the parking regions 204 and 205. When the image 210B shown in FIG. 2 is input to the determination unit 111, logical operation results obtained using the mask information 502 and the mask information 503 are images 601 and 602. The image 601 includes only edges that form the outline of the parking region 204 and does not include the edge information of an automobile parked in the parking region 205. Hence, the edge component amount detected in the determination target region is less than the threshold, and it is determined that an automobile is not parked in the parking region 204. On the other hand, the image 602 includes edges that form the outline of an automobile stopped in the parking region 205. Hence, the edge component amount detected in the determination target region is equal to or greater than the threshold, and it is determined that an automobile is parked in the parking region 205.

Note that, in FIG. 6, if an automobile is not stopped in the parking region as the determination target, the edge information of the outline of the parking region is detected in the determination target region. However, the size of the determination target region may be adjusted so the edge information of the outline is not included in the determination target region. In this case, since the difference of the edge component amount depending on the presence/absence of an automobile becomes greater, the detection accuracy can be raised.

Next, in step S408, the determination unit 111 outputs the obtained determination result to the input/output device 103 via the I/O control unit 113. For example, the input/output device 103 can display the presence/absence of an automobile in each parking region on the display based on the received determination result.

In the above-described flowchart of FIG. 4, the region decision unit 112 sets the determination target region first. Then, the determination unit 111 determines the presence/absence of parking of an automobile in each parking region. Here, when the region setting processing by the region decision unit 112 is performed in advance, the processing need not be executed every time after the determination processing of the determination unit 111. In particular, in a case in which the network camera 101 is stationarily installed, for example, to monitor a parking lot, the determination target region is set at the time of installation. After that, the determination target region is reset when the installation position or angle is changed.

Additionally, the determination processing of step S407 may be executed in real time every time the network camera 101 outputs image data. Alternatively, image data output from the network camera 101 may be saved in a storage device connected to the image processing apparatus 102 or a storage device separately connected to the network 104, and the determination processing of step S407 may be executed at a predetermined timing.

In addition, after it is determined in the determination processing of step S406 that the determination target regions are set for all parking regions, the region decision unit 112 can superimpose the set determination target region on the actual image of the parking lot captured by the network camera 101 and display the image on the input/output device 103. This display may be done in the process of setting the determination target region. The display allows the user to confirm which region of the parking region is the determination target region. An example of the display result is shown in FIG. 3E. Furthermore, at the time of confirmation display, an input to change the size or shape of the determination target region may be received from the user via a predetermined input device of the input/output device 103, and the region decision unit 112 may correct the determination target region in accordance with the received instruction.

An embodiment in the disposition example shown in FIG. 1B has been described above. However, the applicable disposition is not limited to this. For example, FIG. 10A shows a disposition in which a parking region 1001 is captured by a network camera 1002 installed in front. FIG. 10B shows an example of an image captured by the network camera 1002 shown in FIG. 10A. Determination target region setting in such a disposition will be described with reference to FIGS. 11A to 12C.

Figure 11A:
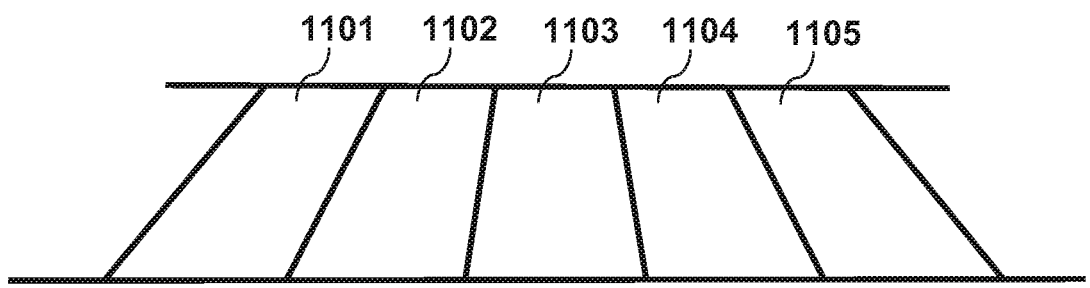
FIG. 11A is a schematic view showing five adjacent parking regions.
Figure 11B:
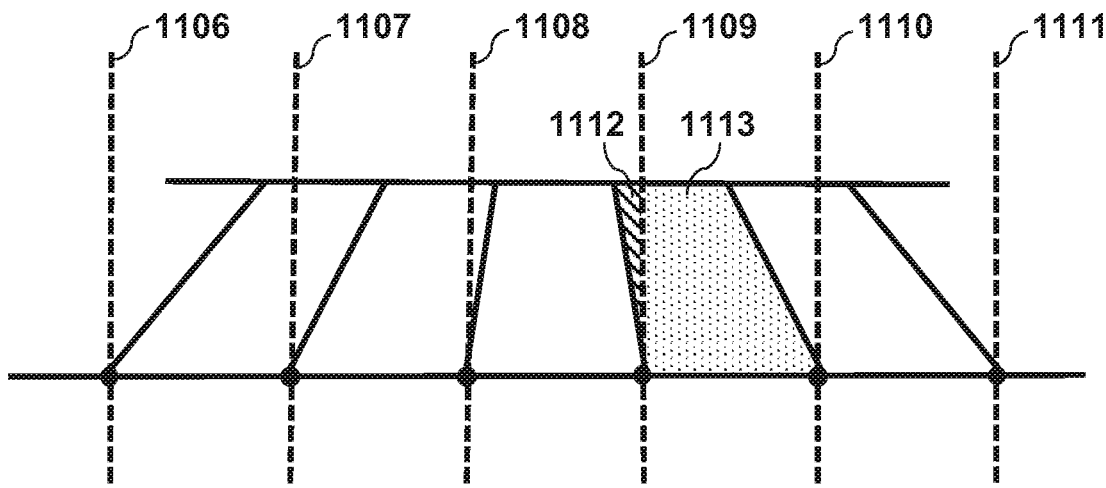
FIG. 11B is a view for explaining an example of a determination target region decision method.
Figure 11C:
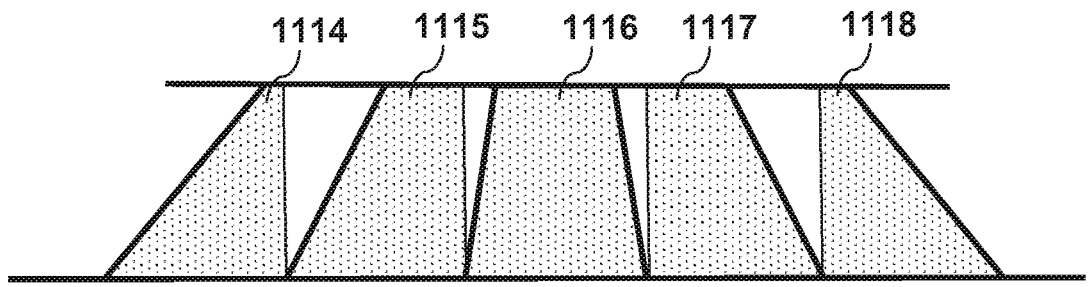
FIG. 11C is a view showing an example of set determination target regions.

FIG. 11A shows five adjacent parking regions 1101 to 1105. A case in which determination target regions are set for these parking regions will be described. Referring to FIG. 11B, broken lines 1106 to 1111 represent perpendiculars set on apexes located on the front part in the apexes of rectangles that form the parking regions 1101 to 1105. Here, for example, inside the parking region 1104, when an automobile is stopped in the parking region 1103 adjacent to the parking region 1104, a region 1112 on the left side of the perpendicular 1109 is shielded by the automobile at a high possibility. On the other hand, even if an automobile is stopped in the parking region 1103 adjacent to the parking region 1104 as the determination target, a region 1113 sandwiched between the perpendiculars 1109 and 1110 is not shielded by the automobile. Determination target regions 1114 to 1118 of the parking regions 1101 to 1105 can be set in this way as shown in FIG. 11C.

Figure 12A:
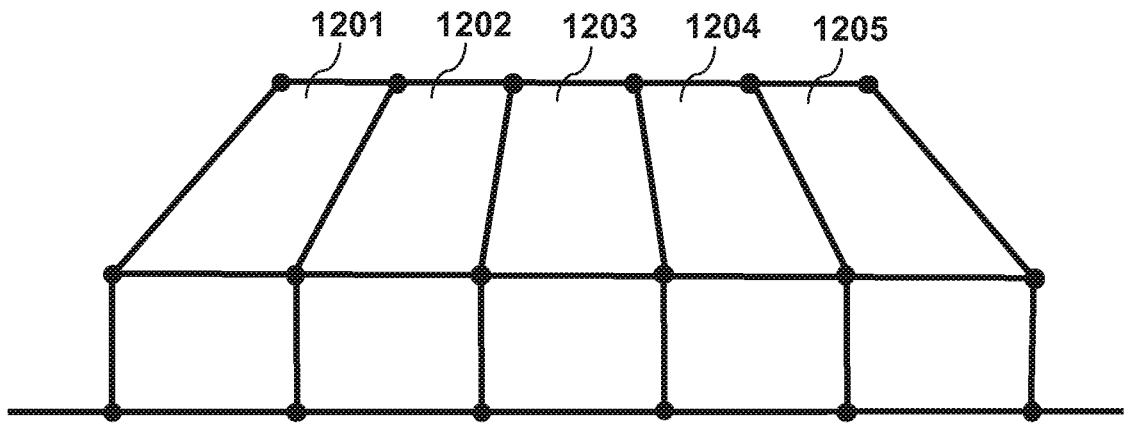
FIG. 12A is a schematic view showing a state in which an automobile is stopped in each of five adjacent parking regions.
Figure 12B:
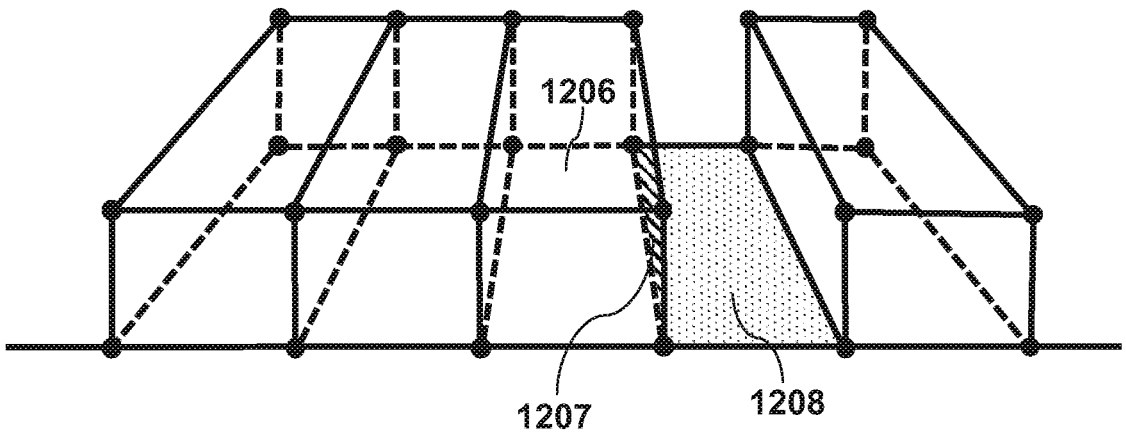
FIG. 12B is a schematic view showing a state in which only the second parking region from the right does not have a stopped automobile.
Figure 12C:
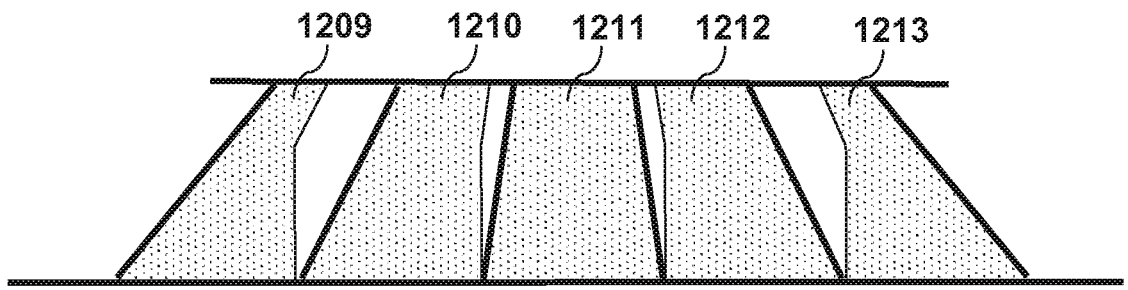
FIG. 12C is a schematic view showing determination target regions corresponding to the parking regions.

A case in which a determination target region is set by a method using a rectangular parallelepiped model will be described next with reference to FIGS. 12A to 12C. FIG. 12A shows a state in which an automobile is stopped in each of five adjacent parking regions by rectangular parallelepiped models 1201 to 1205. FIG. 12B shows a state in which only the second parking region from the right in five adjacent parking regions does not have a stopped automobile. When determining the presence/absence of parking of an automobile in this parking region in this state, a region 1207 is shielded by an automobile (rectangular parallelepiped model 1203) parked in a parking region 1206 adjacent on the left side. On the other hand, even if an automobile is stopped in the parking region 1206 adjacent on the left side, a region 1208 is not shielded by the automobile. Hence, the region 1208 can be set to the determination target region. Determination target regions 1209 to 1213 for the parking regions can thus be set, as shown in FIG. 12C.

As described above, the determination target region can be set even in the disposition as shown in FIG. 10A. In addition, a plurality of network cameras may be installed to perform determination for a parking region formed by a plurality of columns.

According to the above-described embodiment of the invention, when determining the presence/absence of a parked automobile in each of a plurality of adjacent parking regions based on an image captured from one direction, the presence/absence of an automobile in each parking region can accurately be determined without any influence of the presence/absence of automobiles in other parking regions. Additionally, in this embodiment, determination of the presence/absence of parking in each parking region can be performed in addition to the measurement of the degree of congestion in a parking lot. This is useful when constructing the parking state determination system 100 that presents a vacant place in a crowded parking lot.

Second Embodiment

A determination target region decision method according to the second embodiment of the invention will be described next. In the above-described first embodiment, the size of the determination target region set for each parking region is fixed regardless of the presence/absence of an automobile in an adjacent parking region. However, in this embodiment, the size of the determination target region to be set can be changed in accordance with the presence/absence of an automobile in an adjacent parking region.

The arrangement of a parking state determination system 100 and the disposition of a network camera 101 according to this embodiment can be the same as that in the first embodiment shown in FIG. 1A. A method of determining the presence/absence of an automobile in the determination target region by an image processing apparatus 102 can also be the same as the method described in association with FIGS. 2 and 3.

Figure 7:
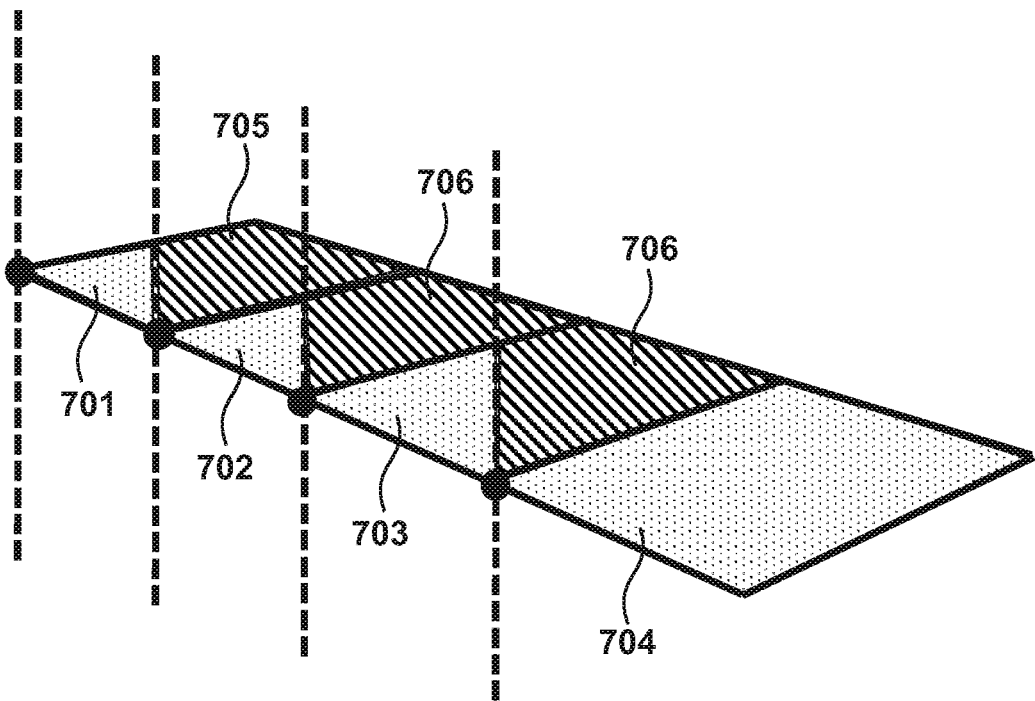
FIG. 7 is a view for explaining an example of a determination target region decision method.

The determination target region decision method according to this embodiment will be described below with reference to FIG. 7. FIG. 7 is a view for explaining the determination target region decision method according to this embodiment. In this embodiment as well, the arrangement of a parking lot as the target of determination target region setting is the same as that shown in FIG. 2. As indicated by an image 201A shown in FIG. 2, the parking lot is configured to include a plurality of parking regions 203 to 206. Perpendiculars shown in FIG. 3A are set on the apexes of the parking regions, thereby dividing the parking regions. As shown in FIG. 7, the parking region 203 is divided into regions 701 and 705, the parking region 204 is divided into regions 702 and 706, and the parking region 205 is divided into regions 703 and 706. However, the parking region 206 is not divided and becomes a region 704 as a whole.

In the first embodiment, the regions 701 to 704 are set to determination target regions to avoid the influence of adjacent parking regions. In this embodiment, however, the determination target region is changed any time in accordance with the presence/absence of parking in adjacent parking regions.

In this embodiment, the presence/absence of parking is determined for the parking region 206 located on the nearest side in the image. At this time, the parking region 206 is located on the nearest side and, therefore, not influenced by an automobile in another adjacent parking region. Hence, the determination target region 704 of the parking region 206 is set to the entire parking region. Next, the determination target region of the second parking region 205 from the near side is decided. At this time, the determination target region is changed depending on the determination result of the parking region 206. If the determination result of the parking region 206 is "parking", at least part of the region 706 is shielded and becomes a non-shielded region due to the influence of the automobile parked in the parking region 206. Hence, the determination target region of the parking region 205 is only the region 703. On the other hand, if the determination result of the parking region 206 is "vacant", the region 706 is not influenced. Hence, the determination target region of the parking region 205 is a region obtained by combining the region 703 and 706. The presence/absence of parking in the parking region 205 is determined based on the thus decided determination target region. Subsequently, for the parking regions 204 and 203, as well, the determination target region is changed in accordance with the determination result of the presence/absence of parking in the parking region on the near side.

As described above, in this embodiment, the presence/absence of parking is determined from the parking region on the nearest side. According to the same concept, the presence/absence of parking may be determined from the parking region on the farthest side, and the determination target region of the parking region on the near side may be changed in accordance with the determination result.

Figure 8:
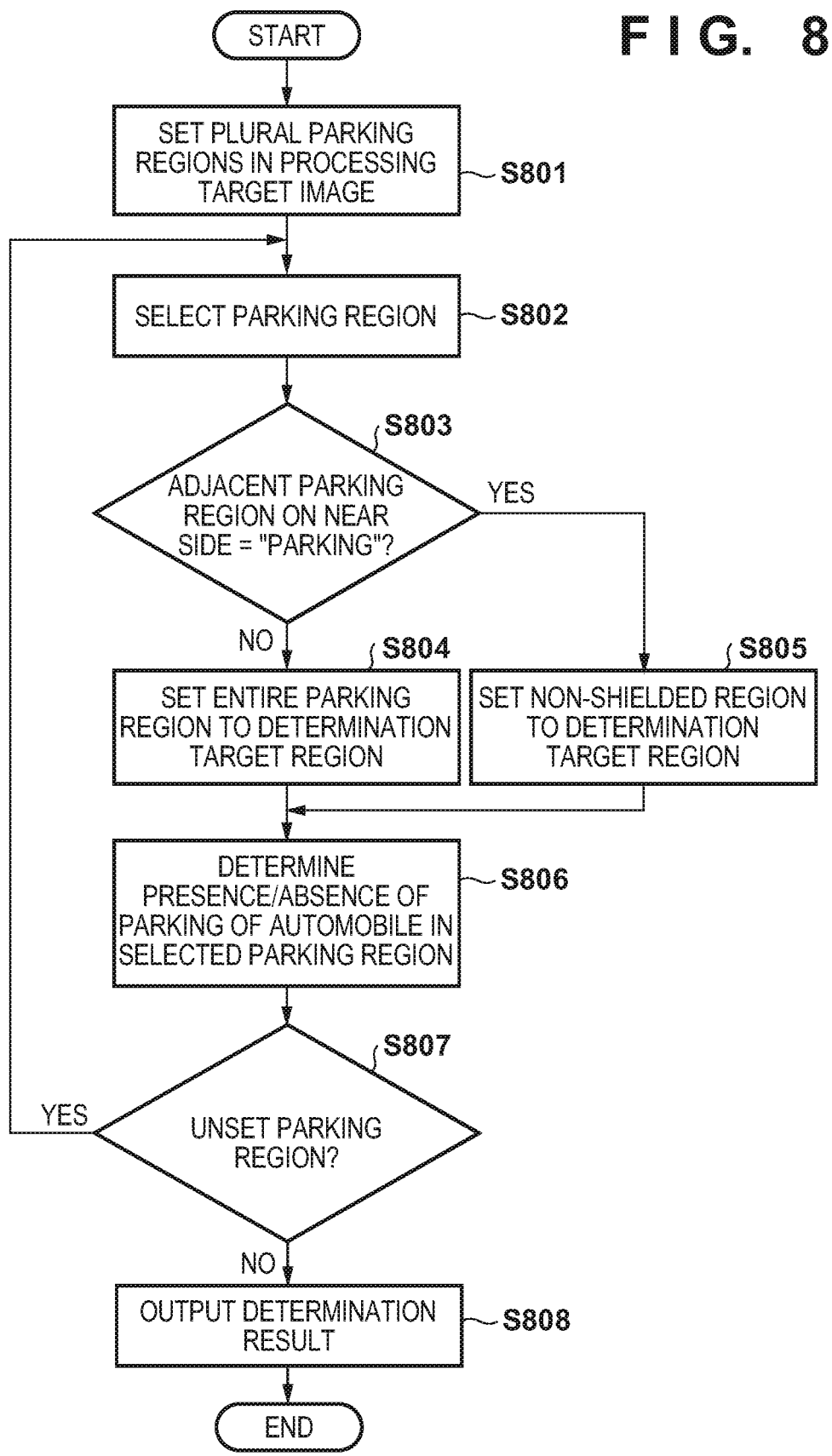
FIG. 8 is a flowchart showing an example of a determination target region setting method.
Figure 9:
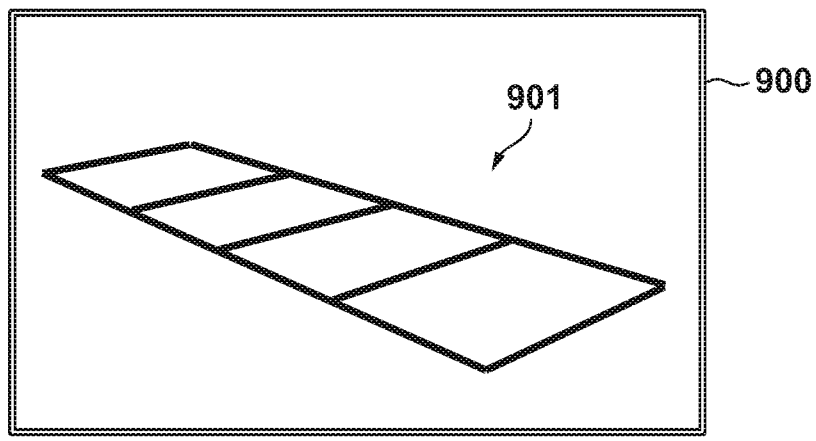
FIG. 9 is an explanatory view of a conventional method.
Figure 9:
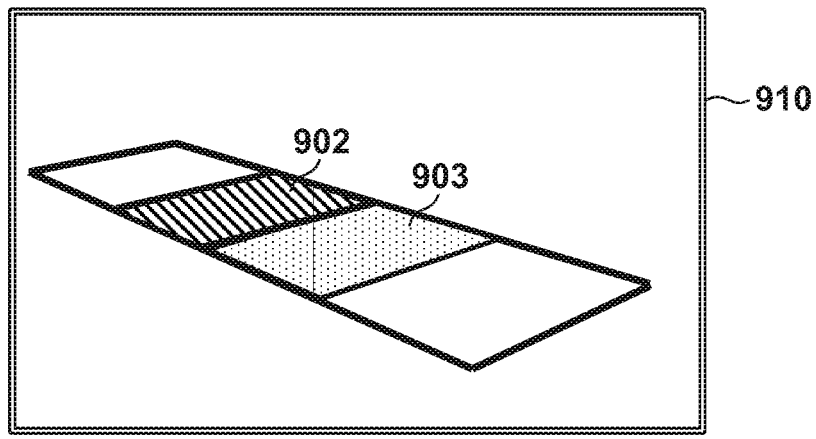
Figure 9:
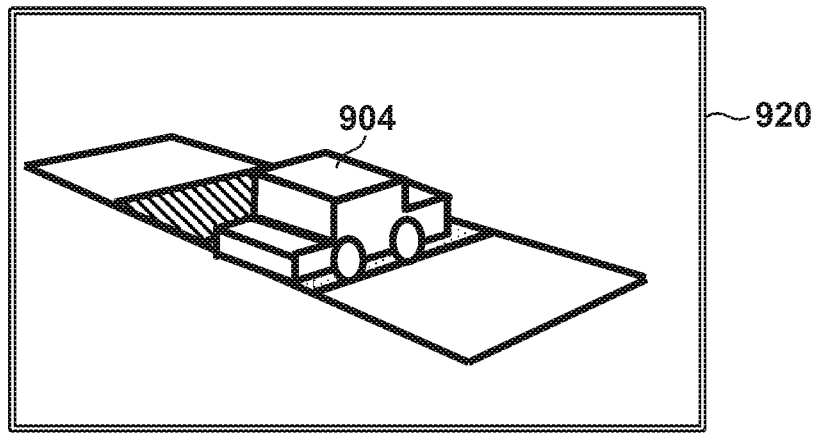

The procedure of processing according to this embodiment will be described next with reference to FIG. 8. FIG.

8 is a flowchart showing an example of processing in the image processing apparatus 102. Processing corresponding to the flowchart can be implemented by, for example, executing a corresponding program (stored in a ROM, or the like) by one or more processors functioning as a data processing unit 110, a determination unit 111, and a region decision unit 112.

First, in step S801, the region decision unit 112 processes an image of a processing target received from the network camera 101 and sets a plurality of parking regions. In this embodiment, as well, the parking regions 203 to 206 are set from the image 201A, as described with reference to FIG. 2. Next, in step S802, the region decision unit 112 selects a parking region to set a determination target region from the plurality of parking regions. At this time, in the parking lot as indicated by the image 201A in FIG. 2, the parking region is sequentially selected from the parking region 206 located on the near side in the image.

Next, in step S803, the region decision unit 112 refers to the determination result of the presence/absence of parking ("parking" or "vacant") in the parking region adjacent on the near side of the selected parking region. If the parking region adjacent on the near side is determined to be "parking", the process advances to step S805. If the parking region is determined to be "vacant", the process advances to step S804. Note that, if the selected parking region is the parking region 206, a parking region adjacent on the near side does not exist, and, therefore, the process advances to step S804.

In step S804, for the selected parking region, the region decision unit 112 sets a determination target region on the entire parking region. At this time, for example, the region decision unit 112 can generate a mask in which the values of pixels corresponding to the entire parking region are set to one, and the pixel values of the remaining region are set to zero. Additionally, in step S805, the region decision unit 112 sets, for the selected parking region, the determination target region to the non-shielded region in the parking region. In the example shown in FIG. 7, one of the regions 701, 702, and 703 is the determination target region. The method of deciding the non-shielded region is the same as described with reference to FIG. 2 or FIG. 7. At this time, for example, the region decision unit 112 can generate a mask in which the values of pixels corresponding to the non-shielded region are set to one, and the pixel values of the remaining region are set to zero. Pieces of mask information 501 to 503 shown in FIG. 5 are examples of masks generated sequentially for the regions 701 to 703 and used to set determination target regions. The region decision unit 112 provides the generated mask information to the determination unit 111 as information used to specify the determination target region.

Next, in step S806, based on the mask information provided from the region decision unit 112 and edge information provided from the data processing unit 110, the determination unit 111 determines the presence/absence of parking of an automobile for the selected parking region. The determination method here is the same as the method described concerning step S407 of the flowchart of FIG. 4 in the first embodiment, and a description thereof will be omitted.

Next, in step S807, the region decision unit 112 determines whether an undetermined parking region for which the presence/absence of a parked automobile is not determined yet exists. If an undetermined parking region exists, the process returns to step S802 to repeat the above-described processing. On the other hand, if an undetermined parking region does not exist, the process advances to step S808. Next, in step S808, the determination unit 111 outputs the obtained determination result to an input/output device 103 via an I/O control unit 113. The input/output device 103 can display the presence/absence of parking of an automobile in each parking region based on the received determination result.

According to the above-described embodiment of the invention, it is possible to set a determination target region according to the presence/absence of an automobile parked in an adjacent parking region and perform determination.

Figure 13A:
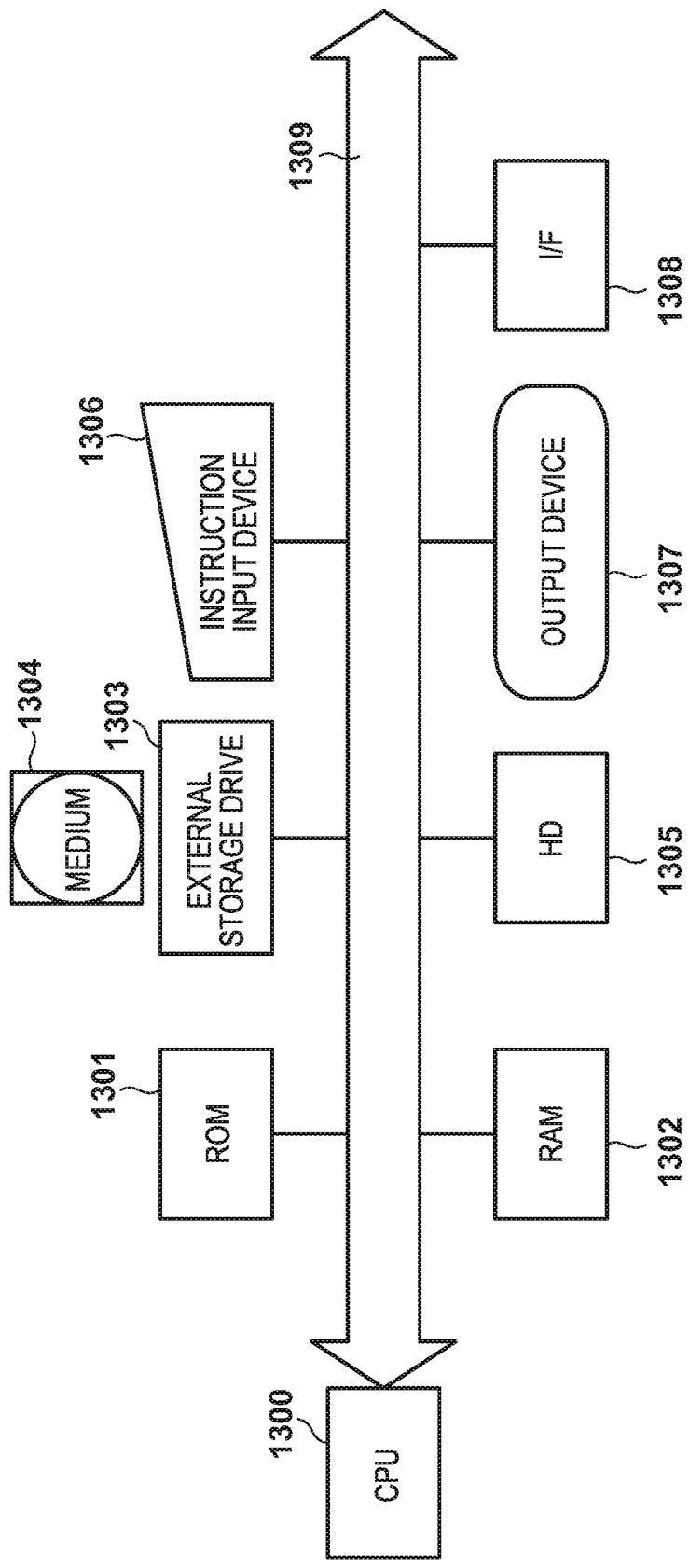
FIG. 13A is a block diagram showing an example of the hardware arrangement of an image processing apparatus 102 that constitutes a parking state determination system 100 corresponding to the embodiment of the invention.

The hardware arrangement of an apparatus that constitutes the parking state determination system 100 according to the above-described first and second embodiments will be described next. FIG. 13A is a block diagram showing an example of the hardware arrangement of the image processing apparatus 102 that constitutes the parking state determination system 100.

Referring to FIG. 13A, a CPU 1300 performs control to execute an application program, an operating system (OS), a control program, and the like, stored in a hard disk drive (to be referred to as an HD hereafter) 1305 and to temporarily store information, a file, and the like, necessary for execution of the program in a RAM 1302. By executing corresponding programs, the CPU 1300 can function as the data processing unit 110, the determination unit 111, and the region decision unit 112 and execute the processes shown in FIGS. 4 and 8 described above.

A ROM 1301 internally stores various kinds of data such as an application program configured to execute predetermined processing in addition to a basic I/O program. The RAM 1302 temporarily stores various kinds of data and functions as the main memory or work area of the CPU 1300. The RAM 1302 also temporarily stores information received from the network camera 101.

An external storage drive 1303 is an external storage drive configured to implement access to a recording medium, and can load a program, or the like, stored in a medium (recording medium) 1304 into the computer system. Note that, as the medium 1304, for example, a Floppy® disk (FD), a CD-ROM, a CD-R, a CD-RW, a PC card, a DVD, a Blu-ray, an IC memory card, an MO, a memory stick, or the like, can be used.

In this embodiment, the external storage device 1305 uses an HD (hard disk) functioning as a mass memory. The HD 1305 stores an application program, an OS, a control program, an associated program, and the like. Note that a nonvolatile storage device such as a Flash® memory may be used in place of the hard disk.

An instruction input device 1306 corresponds to a keyboard, a pointing device (a mouse, or the like), a touch panel, or the like. An output device 1307 outputs a command input from the instruction input device 1306 or a response output of the image processing apparatus 102 to the command. The output device 1307 can include a display, a speaker, a headphone terminal, and the like. A system bus 1309 controls the flow of data in the apparatus.

An interface (to be referred to as an I/F hereafter) 1308 has a function of mediating data exchange with an external device. More specifically, the I/F 1308 can include a wireless communication module, and the module can include a known circuit mechanism including an antenna system, an RF transmitter/receiver, one or more amplifiers, a synchronizer, one or more oscillators, a digital signal processor, a CODEC chip set, a subscriber identification module card, a memory, and the like. The I/F 1308 can also include a wired communication module for wired communication. The wired communication module can communicate with another device via one or more external ports. The I/F 1308 can also include various software components configured to process data. The external port is coupled with another device directly via Ethernet, a USB, an IEEE 1394, or the like, or indirectly, via a network. Note that an alternative of a hardware device may be formed by software that implements the same functions as those of the above-described devices.

Every time a corresponding program is operated to execute processing corresponding to this embodiment, the program may be loaded from the HD 1305 in which the program is already installed to the RAM 1302. In addition, the program according to this embodiment may be recorded in the ROM 1301, configured to form part of a memory map, and directly executed by the CPU 1300. Alternatively, the corresponding program and associated data may directly be loaded from the medium 1304 into the RAM 1302 and executed.

Figure 13B:
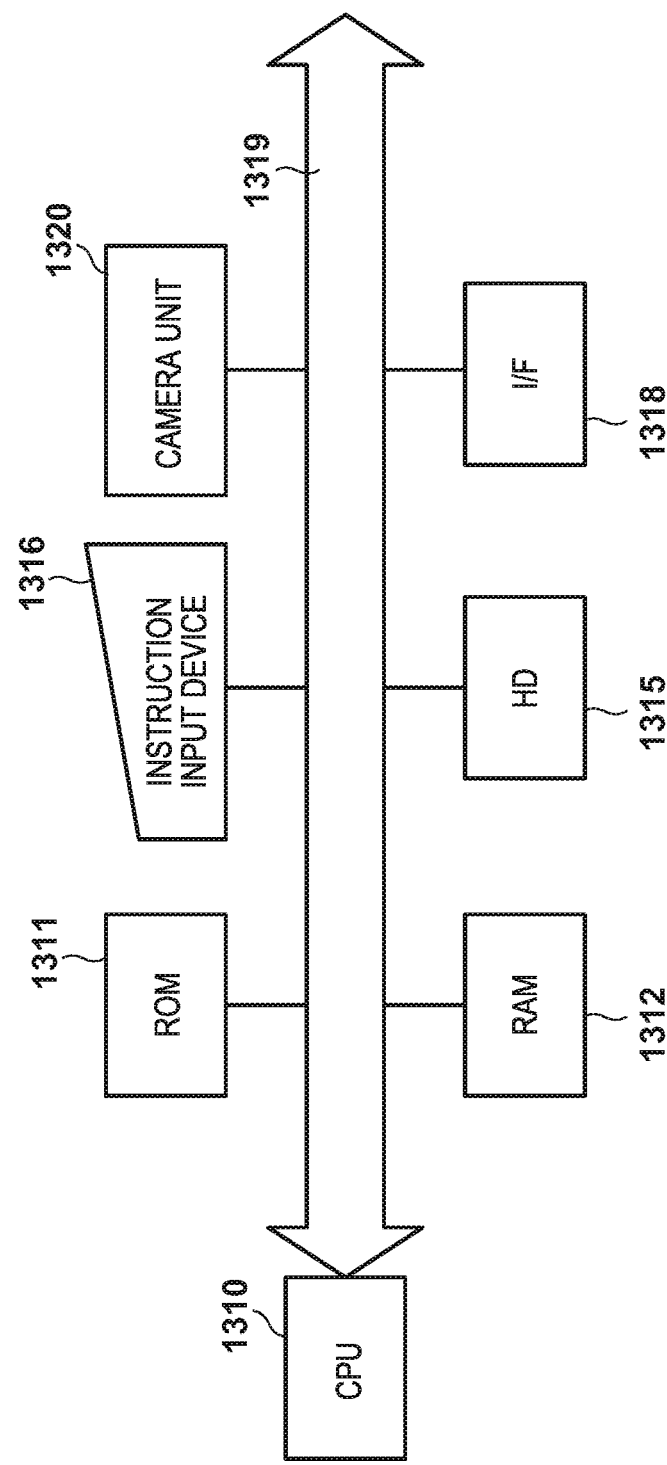
FIG. 13B is a block diagram showing an example of the hardware arrangement of the network camera 101 that constitutes the parking state determination system 100 corresponding to the embodiment of the invention.

Next, FIG. 13B is a block diagram showing an example of the hardware arrangement of the network camera 101 that constitutes the parking state determination system 100. A CPU 1310, a ROM 1311, a RAM 1312, an HD 1315, an instruction input device 1316, an I/F 1318, and a system bus 1319 have the same functions as the CPU 1300, the ROM 1301, the RAM 1302, the HD 1305, the instruction input device 1306, the I/F 1308, and the system bus 1309 described with reference to FIG. 13A, and a description thereof will be omitted. Note that the CPU 1310 can function as the data processing unit 106 by executing a corresponding program. A camera unit 1320 includes an image capturing element such as a CMOS element configured to photoelectrically convert an optical image formed on an imaging plane and to output an analog image signal, an A/D converter configured to convert an analog image signal into a digital image signal, and a development processing unit. The camera unit 1320 has an arrangement corresponding to the image capturing unit 108 and the image input unit 107 shown in FIG. 1A.

OTHER EMBODIMENTS

The embodiments of the invention have been described as the first and second embodiments. However, the invention is not limited to these embodiments, and various changes and modifications can be made within the spirit and scope of the invention.

Embodiment(s) of the invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   a computer;
   a memory; and
   a program stored in the memory that, when executed by the computer, causes the computer to perform:
   acquiring an image obtained by capturing a parking lot including a plurality of parking regions capable of parking a plurality of automobiles;
   deciding, for the image, a determination target region for each of the plurality of parking regions so as to exclude a shielded region that is shielded by an automobile, in a case in which the automobile is parked in another parking region; and
   detecting, from the image, an automobile in each determination target region and determining, based on a result of the detection, the presence/absence of parking of an automobile in each of the plurality of parking regions.

2. The apparatus according to claim 1, wherein, in the deciding, for each of the plurality of parking regions, a non-shielded region that is not shielded by the automobile parked in another parking region is decided to be the determination target region.

3. The apparatus according to claim 1, wherein, in the deciding, a size of the determination target region is changed depending on whether the automobile is parked in a parking region located on a near side of a parking region in the image as a target to determine the presence/absence of parking of the automobile.

4. The apparatus according to claim 3, wherein, in a case in which the automobile is parked in the parking region located on the near side in the image, in the deciding, a non-shielded region that is not shielded by the automobile to the determination target region of the parking region is decided as the target to determine.

5. The apparatus according to claim 3, wherein, in a case in which the automobile is not parked in the parking region located on the near side in the image, in the deciding, for the parking region as the target to determine, an entirety of the parking region is decided to be the determination target region.

6. The apparatus according to claim 1, wherein, in the detecting, the automobile is detected based on a detection result of an edge component in the determination target region.

7. The apparatus according to claim 6, wherein, in the determining, a threshold corresponding to a size of the determination target region is compared with the detection result of the edge component, and when a detected edge component amount is greater than the threshold, it is determined that the automobile exists.

8. The apparatus according to claim 1, wherein the program, when executed by the computer, causes the computer to further perform generating information that identifiably represents, in the image obtained by capturing the parking lot, the determination target region decided in the deciding, for each of the plurality of parking regions.

9. The apparatus according to claim 8, wherein the program, when executed by the computer, causes the computer to further perform correcting the information generated in the generating.

10. The apparatus according to claim 1, wherein the image is an image obtained by capturing the plurality of parking regions from an oblique position.

11. The apparatus according to claim 1, wherein, in the acquiring, the image is acquired from an image capturing device that captures the image.

12. The apparatus according to claim 1, wherein, in the acquiring, the image is acquired from a storage device that stores the image.

13. A control method of controlling an image processing apparatus, the method comprising:
   acquiring an image obtained by capturing a parking lot including a plurality of parking regions capable of parking a plurality of automobiles;
   deciding, for the image, a determination target region for each of the plurality of parking regions so as to exclude a shielded region that is shielded by an automobile in a case in which the automobile is parked in another parking region; and
   detecting, from the image, an automobile in each determination target region, and determining, based on a result of the detection, the presence/absence of parking of an automobile in each of the plurality of parking regions.

14. A non-transitory computer-readable storage medium storing a program that, when executed by a processor of an information processing apparatus, causes the processor to perform:
   acquiring an image obtained by capturing a parking lot including a plurality of parking regions capable of parking a plurality of automobiles;
   deciding, for the image, a determination target region for each of the plurality of parking regions so as to exclude a shielded region that is shielded by an automobile, in a case in which the automobile is parked in another parking region; and
   detecting, from the image, an automobile in each determination target region, and determining, based on a result of the detection, the presence/absence of parking of an automobile in each of the plurality of parking regions.

* * * * *